United States Patent
Zingsem et al.

(10) Patent No.: US 8,413,956 B2
(45) Date of Patent: Apr. 9, 2013

(54) DOUBLE-DISC GATE VALVE

(75) Inventors: Wolfgang Zingsem, Moenchengladbach (DE); Norbert Marx, Dueren (DE)

(73) Assignee: Z & J Technologies GmbH, Dueren (DE)

( * ) Notice: Subject to any disclaimer, the term of this patent is extended or adjusted under 35 U.S.C. 154(b) by 596 days.

(21) Appl. No.: 12/692,119

(22) Filed: Jan. 22, 2010

(65) Prior Publication Data
US 2010/0264349 A1    Oct. 21, 2010

(30) Foreign Application Priority Data
Apr. 16, 2009 (DE) .......................... 10 2009 017 634

(51) Int. Cl.
*F16K 25/00*  (2006.01)
(52) U.S. Cl.
USPC ............ 251/197; 137/554; 251/209; 251/285
(58) Field of Classification Search .................. 137/551, 137/553, 554; 251/193–204, 284, 285, 327
See application file for complete search history.

(56) References Cited

U.S. PATENT DOCUMENTS

| | | | |
|---|---|---|---|
| 3,486,734 A * | 12/1969 | Works et al. .................. 251/285 |
| 4,168,137 A * | 9/1979 | McLain et al. ............. 425/405.2 |
| 4,638,650 A * | 1/1987 | Hafele ............................. 70/179 |
| RE33,649 E * | 7/1991 | Kawai ............................ 137/554 |
| 5,116,022 A * | 5/1992 | Genreith et al. ............. 251/175 |
| 5,220,843 A * | 6/1993 | Rak ............................. 73/862.29 |
| 6,044,860 A * | 4/2000 | Neu ............................... 137/385 |
| 8,118,276 B2 * | 2/2012 | Sanders et al. ........... 251/129.04 |
| 2011/0083746 A1 * | 4/2011 | Hoang ............................. 137/1 |

FOREIGN PATENT DOCUMENTS

| | | |
|---|---|---|
| DE | 10 2005 014 214 A1 | 10/2006 |
| EP | 0 450 646 A2 | 9/1991 |
| EP | 1 561 980 A1 | 8/2005 |
| WO | WO 98/17934 | 4/1998 |

* cited by examiner

*Primary Examiner* — Eric Keasel
*Assistant Examiner* — R. K. Arundale
(74) *Attorney, Agent, or Firm* — Alston & Bird LLP

(57) ABSTRACT

A double-disc gate valve is provided, the shut-off or valve discs of which are displaceable from an open position into a closed position and vice versa by means of an actuator rod, there being associated with the actuator rod a locking device by means of which the valve discs, together with the actuator rod, are fixable in the closed position. The locking device is movable in the longitudinal direction of the actuator rod relative thereto from an unlocking position into a locking position and vice versa, the locking position being variable in dependence upon the closed position of the valve with predetermined maximum pressing force of the valve discs against the associated valve housing sealing seats.

5 Claims, 5 Drawing Sheets

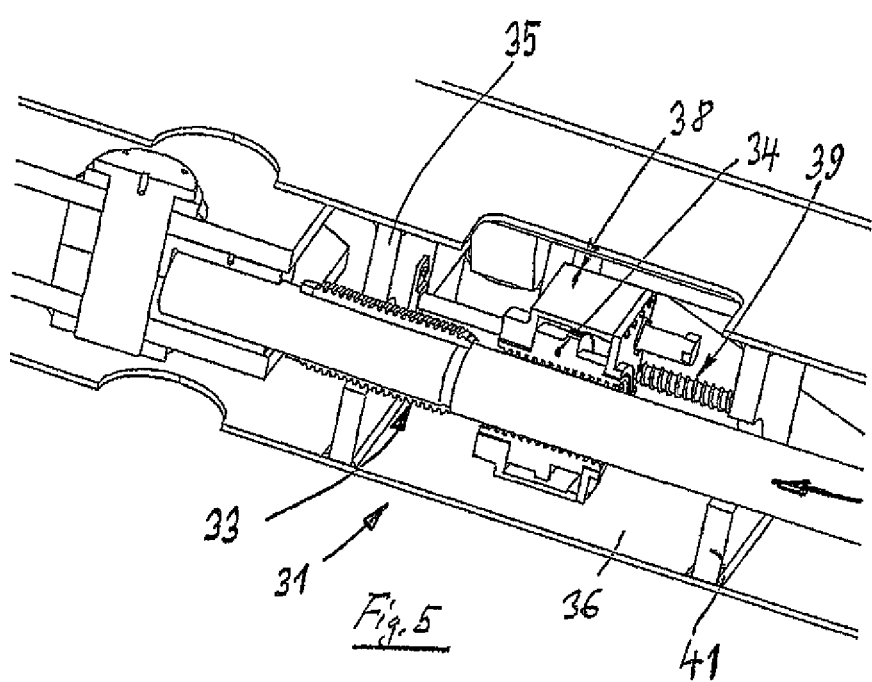

DOUBLE-DISC GATE VALVE

CROSS REFERENCE TO RELATED APPLICATIONS

This application claims the benefit under 35 U.S.C. §119(a) of German Patent Application Serial No. 10 2009 017 634.9, filed Apr. 16, 2009, which is incorporated herein by reference in its entirety.

BACKGROUND OF THE DISCLOSURE

1. Field of the Disclosure

The present invention relates to a double-disc gate valve, the shut-off discs of which are displaceable from an open position into a closed position and vice versa by means of an actuator rod, there being associated with the actuator rod a locking device by means of which the valve discs, together with the actuator rod, are fixable in the closed position.

2. Description of Related Art

In respect of the construction of double-disc gate valves, reference is made to EP 1 561 980 A1, EP 0 450 646 A2 or WO 98/17934. The respective constructions all originate from the Applicant and its predecessors.

Those documents do not disclose a locking device by means of which the valve discs, together with the actuator rod, are fixable in the closed position, but such locking devices are also part of the prior art. They are distinguished by a locking wedge which is displaceable perpendicularly to the actuator rod. The actuator rod is constructed so as to be complementary thereto. The disadvantage of such a construction is that locking can take place only in a rigidly defined position of the actuator rod. It should be borne in mind, however, that the valve discs are subject to wear. It should also be borne in mind that the resilient bias in the region of the sealing seat between the valve discs and the valve housing varies in the course of time. Accordingly, the so-called "compression distance" varies from stroke to stroke, that variation being in the range of from 12 mm+/−8 mm, in order to generate the necessary sealing force between the valve discs and the housing sealing seats. With rigidly positioned locking of the actuator rod for the valve discs, the valve discs therefore cannot be brought into exactly the optimum closed position having the maximum sealing force. Consideration must also be given to the fact that the actuator rod, once the closed position has been reached, moves back again by a certain amount of up to 2 to 3 mm, that is to say until the coupling piece arranged on the actuator rod is in contact with the locking wedge. That behaviour involves the risk that the valve will not be sealed in the closed position.

Because the locking wedge is mounted so as to be movable back and forth perpendicular to the actuator rod and to the drive column associated with the actuator rod, it is also necessary for the drive column to be extended accordingly, consequently requiring a corresponding amount of space.

In the event of an operational malfunction, the full opening force of the hydraulic drive means, plus the spring force of the cup springs in the valve, has be taken by the locking wedge and the corresponding counter-bearings on the drive column and actuator rod. This results in an adverse flow of force and consequently in correspondingly high expenditure in terms of materials. The locking wedge and associated counter-bearings must be of correspondingly strong construction. The same is true of the drive column inside which the actuator rod is arranged so as to be movable back and forth.

It must therefore be ensured that the valve, i.e. the valve discs, remain in the compressed locking position in order to ensure a sealed and reliable closure of the valve. The high contact pressure must be ensured even after the drive means for the valve discs or the actuator rod thereof have been deactivated. In detail:

1. the restoring force of a cup spring assembly acting in the opening direction (about 700,000 N), which force is related to the nature of the construction in accordance with the double-disc principle, must be countered;
2. potential opening of the valve initiated by faulty operation of the hydraulic drive means (about 1,800,000 N) must be fully countered;
3. the compression distance, which varies as a result of the principle of the force-controlled compression and as a result of heat-related expansion, must be fully compensated by the locking means (about 12 mm+/−8 mm).

Furthermore, it must be ensured that the locking can be fully cancelled prior to a fresh opening stroke.

BRIEF SUMMARY OF THE DISCLOSURE

The above-mentioned objectives can be achieved using a double-disc gate valve having a locking device according to claim 1, with advantageous structural embodiments and details being described in the subsidiary claims.

An important aspect of the present invention therefore lies in the fact that the locking device is movable in the longitudinal direction of the actuator rod relative thereto from an unlocking position into a locking position and vice versa, the locking position being variable in accordance with the closed position of the valve at that time. Accordingly, the locking device adapts itself to the optimum locking position of the valve discs or the actuator rod connected thereto. The locking position is therefore not rigidly defined. It is thus possible for the locking to be effected always at the point when the valve discs rest against the housing sealing seats with maximally preset pressing force.

A further aspect of the present invention lies in the specific construction of the locking device according to claims 2 to 6.

A further aspect of the present invention will be evident from the measures according to claims 7 and/or 8.

BRIEF DESCRIPTION OF THE SEVERAL VIEWS OF THE DRAWING(S)

A preferred embodiment of the invention is described in greater detail below with reference to the accompanying drawings, wherein:

FIG. 5 shows the locking device in the re-opened position corresponding to FIG. 2.

DETAILED DESCRIPTION OF THE DISCLOSURE

Figure 1:
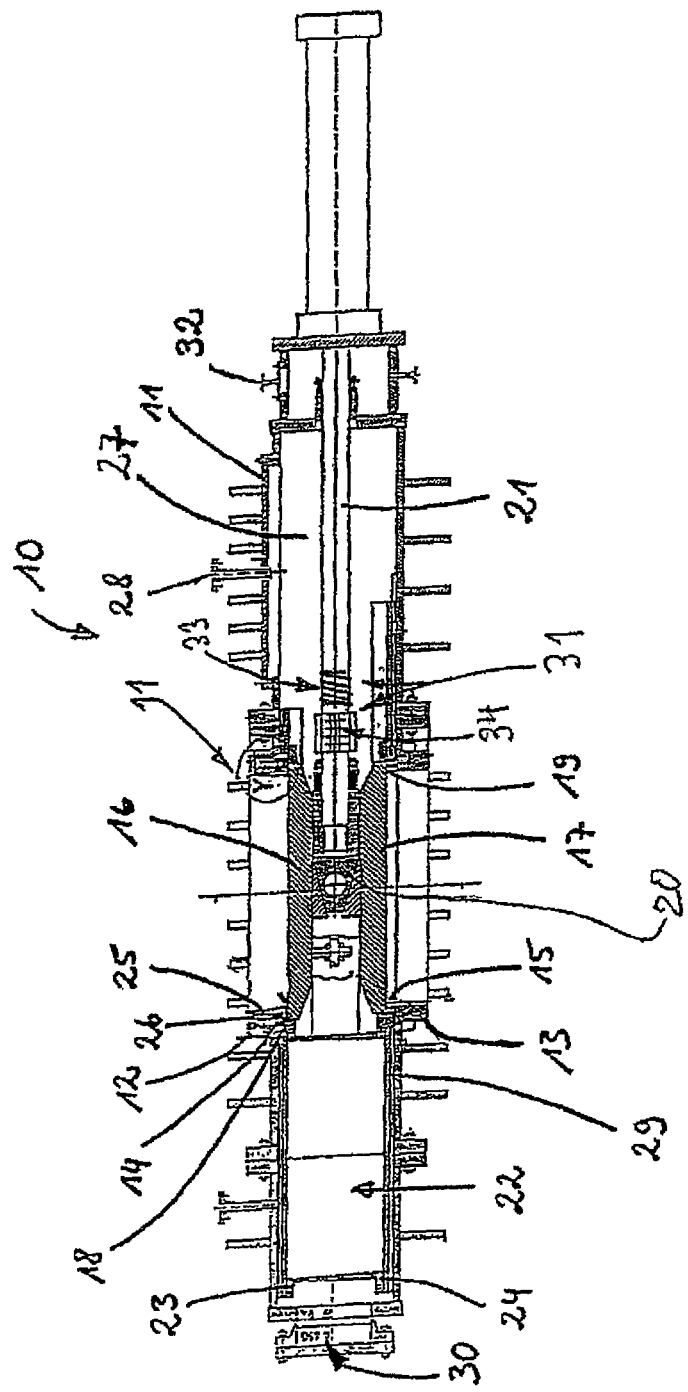
FIG. 1 shows a double-disc gate valve in accordance with the prior art in longitudinal section, and having a locking device according to embodiments of the invention.

FIG. 1 shows, in longitudinal section, a double-disc gate valve 10 according to the prior art, for example in accordance with EP 1 561 980 A1, and having a locking device according to embodiments of the invention. That double-disc gate valve has a valve housing 11 having an upper and a lower pipe socket 12, 13 and an upper and a lower housing sealing seat 14, 15, between which there is displaceably mounted an upper and a lower shut-off or valve disc 16, 17 having an upper and a lower sealing ring 18, 19, respectively. The two valve discs 16, 17 are arranged to be pressed towards the housing sealing seats 14, 15 with the aid of an internal wedge 20 acting as spreader element, which internal wedge is seated at the end of an actuator rod 21 and is rigidly joined thereto. The valve discs 16, 17 are for that purpose arranged to be spread apart by the internal wedge 20, which is centered by means of a ball, in accordance with a "wedge-within-wedge" principle. Such a construction ensures that the valve is easy to operate even under the most stringent thermal and dynamic conditions. Next to the valve discs 16, 17 and the internal wedge 20 there is arranged a bridging pipe 22 which has an upper and a lower sealing ring 23, 24. The bridging pipe 22 is in the form of a hollow cylinder. Cup spring assemblies 25 are arranged on the upper pipe socket 12, on the inner side thereof between the upper housing sealing seat 14 and a contact face 26 belonging to the upper pipe socket 12. By means of the cup spring assemblies 25, the upper housing sealing seat 14, which is arranged to be movable, that is to say displaceable, relative to the upper pipe socket 12 parallel to the direction in which it runs, i.e. axially, is pressed against the peripheral edge of the upper valve disc 16 or the upper sealing ring 23 of the bridging pipe 22, depending upon the valve position.

The cup spring assemblies 25 are distributed uniformly around the entire periphery of the upper housing sealing seat 14 or the upper pipe socket 12 in order to ensure a reliable closing function of the double-disc gate valve 10 resulting from the upper housing sealing seat 14 being pressed uniformly against the upper shut-off disc 16 or its sealing ring 18 (when the valve is in the closed state) or against the upper sealing ring 23 of the bridging pipe 22 (when the valve is in the open position). In FIG. 1, the valve is shown in the closed position. The valve housing 11 is fluid-tight to the outside so that it is possible to establish in the interior 27 of the valve housing a gas pressure which can also be greater than the pressure in the valve passageway. For that reason, the actuator rod 21 extends fluid-tightly into the valve housing 11. On the valve housing 11 there is arranged a connection 28 for connecting to a source of pressurised gas (not shown), especially a source of purging and sealing steam. By continuously purging the interior 27 of the valve housing 11, baking-on of contaminants and resulting malfunctions in the valve and in the plant equipped with the valve is avoided. The sealing faces of the sealing rings 23, 24 on the one hand and the housing sealing seats 14, 15 on the other hand are each arranged extending parallel to the direction of operation of the valve. In order to increase wear resistance, the above-mentioned components are hardened or armoured in a manner known per se. Maintenance apertures 30 allow easy access to be gained in particular to the bridging pipe 22 inter alia for observation purposes. During operation of the plant in which the valve is integrated, the maintenance apertures 30 are normally provided with blind flanges or housing covers in order that the housing can be acted upon, as described above, by pressurised gas or sealing or purging steam. By way of a coolant inlet 32, the actuator rod 21 can be cooled, especially at its end projecting out of the housing. This is preferably effected by means of cold air or cold gases. It should be mentioned at this point that cooling with a liquid is also possible.

The shut-off discs 16, 17 are movably arranged in a goggles-shaped disc cage (not shown in the Figures) which provides for their mounting. The disc cage is guided between guide plates 29, thus avoiding penetration of contaminants into the housing.

As already mentioned at the beginning, the actuator rod 21 is preferably associated with a locking device with which the actuator rod is lockable in a rigidly defined position, that position being the closed position and, if required, also the open position of the valve, i.e. of the valve discs.

A preferred embodiment of a locking device constructed in accordance with the invention and the operation thereof will now be described in detail with reference to FIGS. 2 to 5. This locking device, indicated by reference numeral 31, comprises on the one hand a threaded portion, especially a trapezoidally threaded portion 33, arranged on the actuator rod 21 and on the other hand a locking nut 34 which is arranged to be screwed onto the latter, wherein in the closed position of the valve 10 the nut 34 can be screwed onto the threaded portion 33 as far as a stop 35 which is arranged in fixed position with respect to the actuator rod 21 for locking thereof.

The stop 35 is part of the valve housing 11, in the present case part of a drive column 36 accommodating the actuator rod 21, which drive column is rigidly joined to the valve housing 11.

The locking nut 34 can be screwed onto and unscrewed from the threaded portion 33 of the actuator rod 21 by means of an electric, pneumatic or—as here—hydraulic drive means 37.

In the case of the embodiment shown, the locking nut 34 is arranged inside a gear housing 38, which is displaceably mounted parallel to the actuator rod 21, and is movable therewith in the longitudinal direction.

On movement of the actuator rod 21 in the closed position, the gear housing 38 is arranged to be pressed by a helical compression spring 39 towards the threaded portion 33 on the actuator rod 21, so that the locking nut 34 can be screwed onto the threaded portion 33 in a controlled way.

Figure 2:
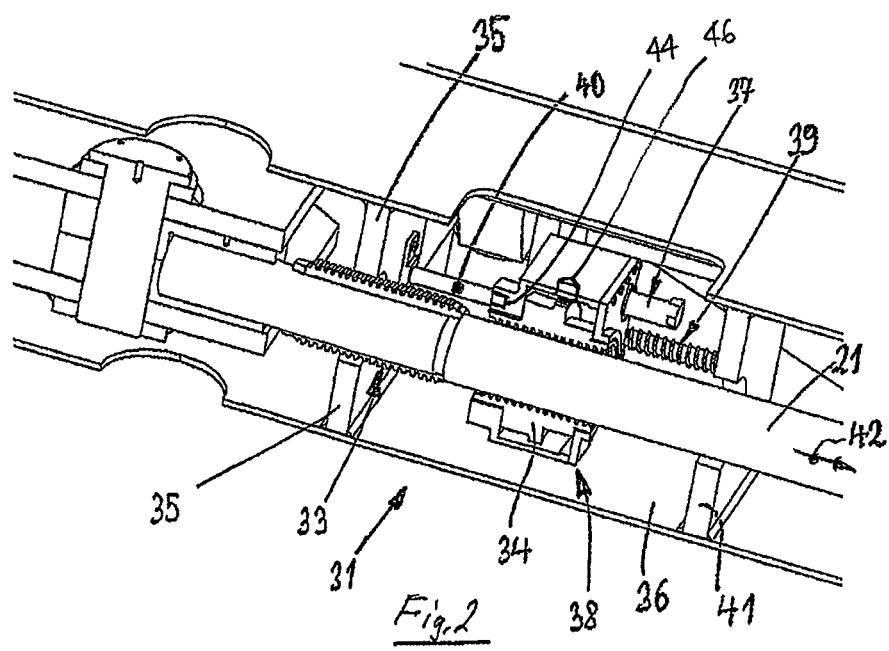
FIG. 2 shows an embodiment of a locking device, constructed in accordance with the invention, for a double-disc gate valve, for example in accordance with FIG. 1, partly in perspective view, partly in longitudinal section, in the fully opened position.

In FIG. 2 that state has not yet been reached. In the FIG. 2 the gear housing 38, together with the locking nut 34, is still located in front of the threaded portion 33. The gear housing 38 is displaceably mounted parallel to the actuator rod 21, its mounting being effected on longitudinal guide rods 40.

Helical springs 39 on the guide rods 40 determine the "forward" position of the housing 38, in which the threaded portion 33 and the locking nut 34 meet one another. The helical springs 39 are each arranged between the gear housing 38 and the valve housing 11, that is to say an associated stop 41 inside the drive column 36, as shown in FIG. 2.

Figure 3:
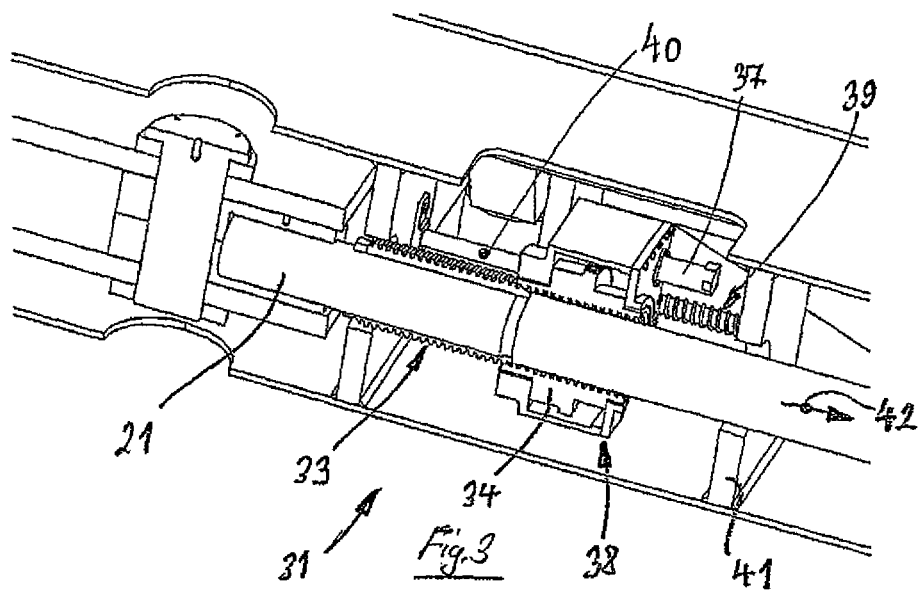
FIG. 3 shows the locking device in accordance with FIG. 2 in a position immediately before initiation of the locking operation.

While the actuator rod 21 is being moved further in the closed position of the valve in the direction of arrow 42 in FIG. 3 and the valve discs joined to the actuator rod are being compressed against the housing sealing seats, the gear housing 38 together with the locking nut 34 are displaced therewith, the locking nut 34 being held in contact with the threaded portion 33. As a result of the axial displacement of the gear housing 38 likewise in the direction of arrow 42, the helical springs 39 on the guide rods 40 are further biased. Tolerances in the compression distance, which can be 12 mm+/−8 mm, are fully compensated by the spring-biasing so that the threaded portion 33 and the locking nut 34 are always in contact in the closed position of the valve. Reference is made to FIG. 3 in this connection.

Figure 4:
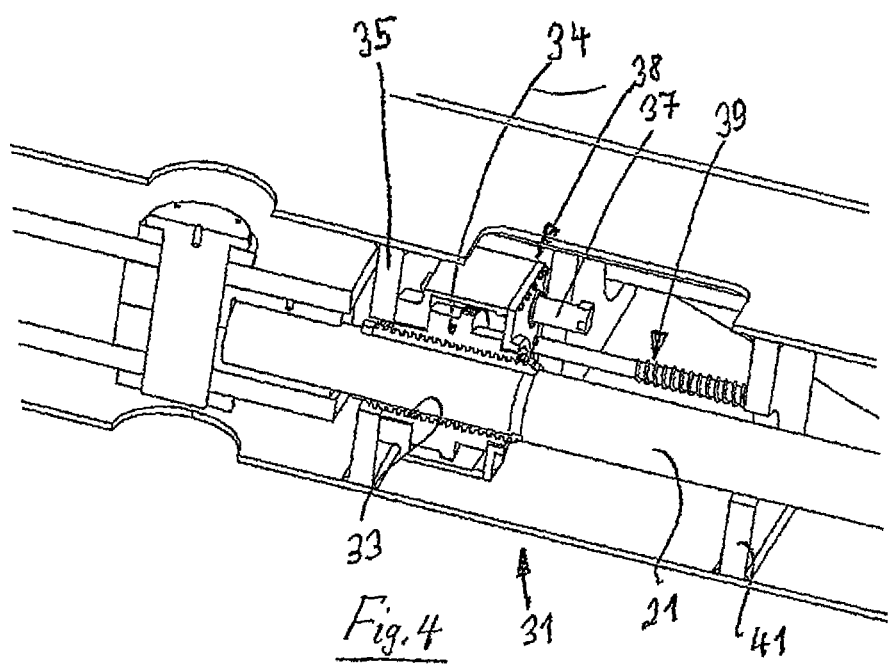
FIG. 4 shows the locking device in accordance with FIG. 2 or 3 in the locking position.

Then, by means of a hydraulic drive means 37, rotation of the locking nut 34 is effected with the intermediate arrangement of cogwheels (not shown). As a result of that rotation, the locking nut 34 is screwed onto the threaded portion 33 of the actuator rod 21 until the gear housing 38 is in contact with the stop 35. A redundant sensor system is used to detect that the locking nut, or the gear housing 38 accommodating it, has reached the stop 35. The rotational movement of the locking nut 34 is stopped. The hydraulic drive means 37 of the valve can then be deactivated, because the actuator rod is now reliably locked in its position by the self-locking in the trapezoidally threaded portion 33. The necessary sealing of the valve is ensured. The above-described position of the locking nut 34 is shown in FIG. 4.

For opening the valve, first of all the hydraulic drive means is started. The locking nut 34 is unscrewed from the threaded portion 33. A measuring system registers the rotation of the locking nut and deactivates it as soon as the locking nut and the associated gear housing have been fully unscrewed from the threaded portion 33 again. The actuator rod has now been fully unlocked again and the valve can be opened again. During the opening stroke, the locking nut and the gear housing remain in contact with the threaded portion 33 until the helical compression springs 39 on the guide rods 40 have relaxed again. Thereafter the locking nut 34 and the gear housing 38 remain in their position, while the valve is opened further. Reference is made to FIG. 5 in this connection. The locking device then has the position in accordance with FIG. 2 again.

Unlike the known locking systems, in the case of the locking device according to the invention it is possible to monitor important operating states of the valve by means of an additionally installed sensor system:

- by means of a rotary encoder 46 mounted on the hydraulic motor or on the drive pinion of the locking nut it is possible to ascertain the exact position and speed of the locking device or the locking nut relative to the actuator rod. This allows accurate determination of whether complete locking or unlocking has been effected, independently of in which position of the actuator rod the fully closed position of the valve has been reached. Locking and unlocking generate important clearances for the further automatic operation of the unit or a coker unit closure valve.
- by means of a force-measuring device 44 integrated in the gear housing, it is also possible for the contact force between the locking means and the stop on the drive column to be measured during operation, especially during coker unit operation. That force is an indicator of whether the valve discs are being compressed sufficiently strongly against the housing sealing seats. Monitoring of that force provides information relating to the sealing of the valve during operation and any wear to the internal wedge mechanism.

All features disclosed in the application documents are claimed as important to the invention insofar as they are novel individually or compared with the prior art.

Many modifications and other aspects of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific aspects disclosed and that modifications and other aspects are intended to be included within the scope of the appended claims.

Although specific terms are employed herein, they are used in a generic and descriptive sense only and not for purposes of limitation.

REFERENCE NUMERALS 10 double-disc gate valve
11 valve housing
12 upper pipe socket
13 lower pipe socket
14 upper housing sealing seat
15 lower housing sealing seat
16 upper valve disc
17 lower valve disc
18 upper sealing ring
19 lower sealing ring
20 internal wedge
21 actuator rod
22 bridging pipe
23 upper sealing ring
24 lower sealing ring
25 cup spring assembly
26 contact face
27 interior of the valve housing
28 connection
29 guide plate
30 maintenance aperture
31 locking device
32 coolant inlet
33 threaded portion
34 locking nut
35 stop
36 drive column
37 hydraulic drive means
38 gear housing
39 helical compression spring
40 longitudinal guide rod
41 stop
42 arrow
44 force-measuring device
46 rotary encoder That which is claimed:

1. A double-disc gate valve, the shut off or valve discs of which are displaceable from an open position into a closed position and vice versa by means of an actuator rod, there being associated with the actuator rod a locking device by means of which the valve discs, together with the actuator rod, are fixable in the closed position, wherein the locking device is movable in the longitudinal direction of the actuator rod relative thereto from an unlocking position into a locking position and vice versa, the locking position being variable in dependence upon the closed position of the valve with predetermined maximum pressing force of the valve discs against associated valve housing sealing seats: wherein the locking device comprises a trapezoidally threaded portion arranged on the actuator rod and a locking nut which is arranged to be screwed onto the actuator rod, wherein in the closed position of the valve the locking nut is capable of being screwed onto the threaded portion as far as a stop which is arranged in fixed position with respect to the actuator rod for locking thereof, wherein the locking nut is capable of being screwed onto and unscrewed from the threaded portion of the actuator rod by means of one of an electric, pneumatic and hydraulic drive means, and wherein the locking nut is arranged inside a gear housing, which is displaceably mounted parallel to the actuator rod, and is movable therewith in the longitudinal direction.

2. A gate valve according to claim 1, wherein the stop is part of a valve housing comprising a drive column accommodating the actuator rod.

3. A gate valve according to claim 1, wherein on movement of the actuator rod in the closed position, the locking nut and the gear housing associated therewith is pressed by a resilient element comprising a helical compression spring towards the threaded portion on the actuator rod, so that the locking nut is capable of being screwed onto the threaded portion without play.

4. A gate valve according to claim 1, wherein there is associated with the drive means and the locking nut a rotary encoder by means of which the position and one of the locking and unlocking speed of the locking nut is capable of being ascertained.

5. A gate valve according to claim 1, wherein on one of the locking nut, the associated gear housing, and the stop there is provided a force-measuring device comprising a strain gauge configured to obtain at least one of a measure of the closing force and the wear of the valve discs.

* * * * *